March 16, 1937.    L. V. FOSTER    2,074,106
METALLOGRAPHIC ILLUMINATING SYSTEM AND PRISM THEREFOR
Filed Feb. 28, 1935
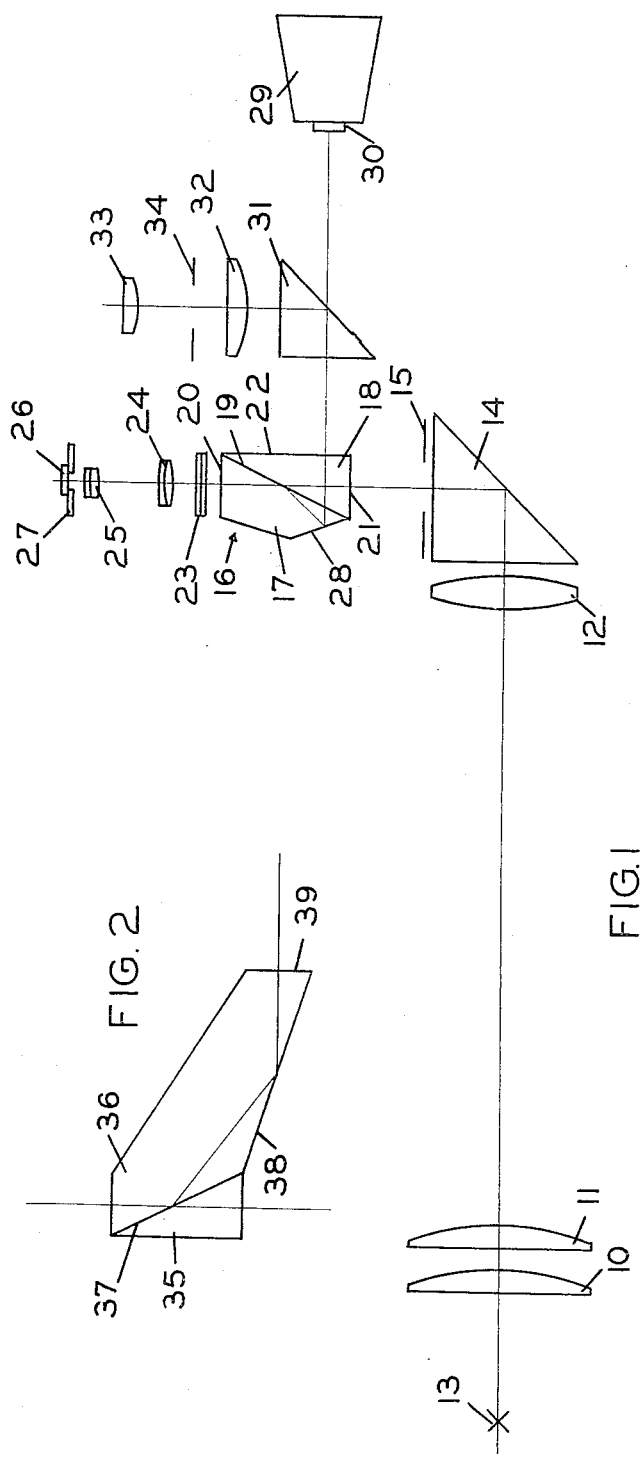
LEON V. FOSTER
INVENTOR Patented Mar. 16, 1937

2,074,106

UNITED STATES PATENT OFFICE 2,074,106

METALLOGRAPHIC ILLUMINATING SYSTEM AND PRISM THEREFOR

Leon V. Foster, Irondequoit, N. Y., assignor to Bausch & Lomb Optical Company, Rochester, N. Y., a corporation of New York Application February 28, 1935, Serial No. 8,677

6 Claims. (Cl. 88—39)

The present invention relates to microscopes and more particularly to an optical system for a metallographic microscope.

One of the objects of the present invention is to provide a new and improved optical system for metallographic microscopes. Another object is to provide a new and improved polarizing prism for use therein. A further object is to provide a new and highly efficient light dividing system for vertical illumination of microscope specimens. A further object is to provide a new and improved system for selectively examining microscope specimens with polarized light. A further object is to provide a light dividing prism in which the light losses are reduced to a minimum. A further object is to provide an optical system for a microscope in which a single prism acts both as polarizer and analyzer. A further object is to provide a new analyzer for a polarization microscope in which the ordinary rays are observed at the camera or ocular. Still another object is to provide a metallurgical microscope in which the illuminating beam passing to the objective is polarized in one plane, is passed through a quarter wavelength plate both going to and coming from the objective and reenters the polarizing prism with its plane of polarization at ninety degrees to the original plane of polarization. These and other objects and advantages reside in certain novel features of construction, arrangement and combination of parts as will hereinafter be more fully set forth and pointed out in the appended claims.

Referring to the drawing:

Fig. 1 is a diagrammatic illustration of one form of this invention.

Fig. 2 is a diagrammatic illustration of a modified form of prism.

A preferred form of this invention is illustrated in the drawing wherein 10, 11, and 12 indicate condensing lenses for directing the light rays from a source 13 horizontally to a prism 14 which reflects the light rays upwardly through a diaphragm 15 onto a polarizing prism indicated generally at 16. The polarizing prism 16 is formed of two pieces of calcite or the like 17 and 18 cemented together at 19 as in a Nicol prism. The two ends 20 and 21 are perpendicular to the longitudinal axis of the prism while the side face 22 is parallel to the longitudinal axis and is given a light absorbing coating near the flat surface 20. Thus the extraordinary ray passes through the prism while the ordinary ray is reflected from the cemented surface 19 and is absorbed by the coating on the side face 22. When conventional illumination of the specimen is desired, the extraordinary ray is passed through a quarter wavelength plate 23 and through the objective lenses 24 and 25 to the specimen 26 resting on an apertured plate 27 above the objective.

The light from the specimen 26 is reflected back through the objective lenses 24 and 25 and through the quarter wave-length plate 23 to the prism 16. The quarter wavelength plate is located so that the direction of the slow ray is at 45 degrees to the plane of vibration of the polarizing prism 16. The reflected light from the specimen, after passing twice through the quarter wavelength plate, thus enters the prism 16 as plane polarized light if, during its course through the objective and its reflection at the specimen, there has been nothing to cause depolarization. This plane polarized beam is vibrating at 90 degrees to the direction of the plane polarized light beam which first left the prism. The direction of vibration of this reflected ray is parallel to the direction of vibration of the ordinary ray of the prism 16 and by the construction of this prism, it is this ray which is reflected at the surface 19 to the surface 28. The surface 28 is silvered and inclined at such an angle that the beam of plane polarized light is reflected perpendicular to the longitudinal axis of the prism and passes out of the prism normal to the surface 22 to a camera 29 having the usual lens system 30.

It is well known in the art that, when a beam of light is passed through anisotropic material, it is divided into two parts, one part being refracted more than the other and one part obeying the laws of ordinary refraction while the other does not. The anisotropic material is said to have an ordinary index of refraction which is constant and does not vary for different directions and an extraordinary index of refraction which is different for every different direction through the material. Thus the beam of plane polarized light which leaves the objective and passes through the prism by reflection at 19 and 28, passes through it as though the prism were isotropic. It is for this reason that this polarizing-analyzing prism does not require fitting with the stigmatizing lenses which are necessary with the usual form of Nicol prism where the transmitted beam obeys the laws of extraordinary refraction.

In order to examine the polarization effects of a specimen, that is, to examine the specimen between crossed Nicols, all that is necessary is the removal of the quarter wavelength plate 23 since without this plate the rays reflected from the specimen will be vibrating in the same plane as those leaving the prism and will thus pass through the prism without being reflected to the camera 29. It is only when the specimen depolarizes the incident beam or changes its direction of vibration that the beam reflected from the specimen will be reflected at 19 and 28 into the camera. Obviously any desired retardation plate could be substituted for the quarter wavelength plate 23 in order to obtain sensitive tint changes for small changes of polarization as is well known in the art.

An ocular system comprising a prism 31, two lenses 32 and 33 and a diaphragm 34 is provided for viewing the specimen 26. The ocular system is used alternatively with the camera and can be selectively moved into the light path between the prism 16 and the camera 29. Another alternative is to mount the camera 29 and the prism 31 permanently on spaced radial axes in the same plane and to rotate the prism 16 to direct the light selectively to one or the other. The ocular is usually mounted for rotation about the horizontal optical axis so that the elevation of the ocular can be varied to suit the convenience of the operator.

Fig. 2 illustrates an alternative form of prism composed of two pieces of calcite 35 and 36 cemented at 37. Instead of reflecting the light rays across the axis the calcite member 36 is elongated and has a reflecting face 38 which reflects the light rays from the surface 37 at a right angle to the longitudinal axis of the prism. The surface 39 of the member 36 is perpendicular to the reflected beam. This prism can be substituted for the prism 16 without changing the operation or function of any of the remaining elements. Various other prism systems can be used and will be readily apparent to one skilled in the art.

In the conventional vertical illuminating system for metallographic microscopes a polished glass plate is used as a light divider. The light losses in such a system are so high that the light intensity at the ocular or camera is only from one to five per cent of the original illuminating beam. With the present invention these losses are reduced to such an extent that the light intensity at the ocular or camera is between twenty and forty per cent of the original illuminating beam. The present optical system thus increases the brightness of the image many times. The birefringent material of the prisms 17 and 18 or 35 and 36 may be cut and assembled in many ways as will be apparent to one skilled in the art. The prism 16 may be of the Nicol type, the Glan-Thompson type, or, in fact, practically any type of polarizing prism where the ordinary ray is reflected in a single beam at the interface of the prism.

From the foregoing it is apparent that I am able to obtain the objects of my invention and provide a new and improved optical system for a metallographic microscope which can be used for examination with either conventional or polarized light, which reduces the light losses to a minimum and which is relatively simple to construct. Various modifications can, of course, be made without departing from the spirit of this invention or the scope of the appended claims.

I claim:

1. A polarizing device comprising two birefringent prisms so cemented together at an interface as to totally reflect an ordinary ray at said interface while permitting an extraordinary ray to pass therethrough, one of said prisms having means for absorbing the ordinary ray produced by a beam entering one end of said device, and the other of said prisms having means for reflecting in a direction at right angles to the longitudinal axis of the device, the ordinary ray produced by a beam entering the other end of said device.

2. An apparatus of the character described comprising means for illuminating an object with polarized light, a microscope objective for forming an image of said object, and a polarizing prism, said prism having means for separating the light received from said object through said objective into ordinary and extraordinary rays and means for directing the ordinary ray to the image plane of said objective.

3. An apparatus of the character described comprising means for illuminating an object with polarized light, a microscope objective and an analyzing prism for receiving light from said object passing through said objective, said prism having an interface for separating incident light into an ordinary and an extraordinary ray, means for reflecting one of said rays at said interface, and means on said prism for directing said reflected ray to the image plane of said objective.

4. An apparatus of the character described comprising means for illuminating an object with polarized light, a microscope objective, and an analyzing prism for receiving light from said object passing through said objective, said prism comprising two birefringent members secured together at an interface for separating incident light into an ordinary and an extraordinary ray, means for reflecting the ordinary ray at said interface and means for directing said ordinary ray to the image plane of said objective.

5. In an apparatus for the microscopic examination of opaque objects, a prism having means for dividing unpolarized light into two beams of light polarized in mutually perpendicular planes and means for transmitting one of said polarized beams therethrough, a source of light, a microscope objective, means for directing an illuminating beam from said source of light through said prism and through said objective to illuminate an object, means for directing the illuminating beam reflected from said object through said objective to said prism, and means for directing to the image plane of the objective, a beam produced in the prism from the reflected illuminating beam, which is polarized in a plane perpendicular to the plane of polarization of the beam transmitted through the prism.

6. In an apparatus for the microscopic examination of opaque objects, a prism having means for dividing unpolarized light into two beams of light polarized in mutually perpendicular planes and means for transmitting one of said polarized beams therethrough, a source of light, a microscope objective, means for directing an illuminating beam from said source of light through said prism and through said objective to illuminate an object, means for directing the illuminating beam reflected from said object through said objective to said prism, means for directing to the image plane of the objective, a beam produced in the prism from the reflected illuminating beam, which is polarized in a plane perpendicular to the plane of polarization of the beam transmitted through the prism, and a quarter wave-length plate located in the light path between said prism and said object.

LEON V. FOSTER.